(12) United States Patent
Cook

(10) Patent No.: US 8,990,954 B2
(45) Date of Patent: Mar. 24, 2015

(54) DISTRIBUTED LOCK MANAGER FOR FILE SYSTEM OBJECTS IN A SHARED FILE SYSTEM

(75) Inventor: Steven D. Cook, Saint Paul, OR (US)

(73) Assignee: International Business Machines Corporation, Armonk, NY (US)

( * ) Notice: Subject to any disclaimer, the term of this patent is extended or adjusted under 35 U.S.C. 154(b) by 1523 days.

(21) Appl. No.: 11/765,912

(22) Filed: Jun. 20, 2007

(65) Prior Publication Data

US 2008/0319996 A1   Dec. 25, 2008

(51) Int. Cl.
*G06F 7/04* (2006.01)
*H04L 29/06* (2006.01)
*G06F 17/30* (2006.01)
*G06F 9/46* (2006.01)
*G06F 9/52* (2006.01)
*G06F 21/62* (2013.01)
*H04L 29/08* (2006.01)
*G06F 21/60* (2013.01)
*G06F 11/14* (2006.01)
*G07F 17/30* (2006.01)

(52) U.S. Cl.
CPC .......... *G06F 17/30171* (2013.01); *G06F 9/465* (2013.01); *G06F 9/52* (2013.01); *G06F 21/6218* (2013.01); *H04L 63/10* (2013.01); *G06F 17/30224* (2013.01); *H04L 67/1097* (2013.01); *G06F 21/604* (2013.01); *G06F 11/1435* (2013.01); *H04L 67/1095* (2013.01)
USPC ................. 726/27; 726/20; 713/164; 713/165

(58) Field of Classification Search
CPC ....... G06F 9/52; G06F 9/465; G06F 11/1435; G06F 17/30224; G06F 17/30171; G06F 21/604; G06F 21/6218; Y10S 707/99938; Y10S 707/99953; H04L 63/10; H04L 67/1095; H04L 67/1097
USPC .............. 726/16–20, 26–27, 31, 30; 713/164, 713/165
See application file for complete search history.

(56) References Cited

U.S. PATENT DOCUMENTS 5,202,971 A * 4/1993 Henson et al. .................... 1/1
5,454,108 A * 9/1995 Devarakonda et al. ........ 718/104
(Continued)

FOREIGN PATENT DOCUMENTS

EP    0450917 A2    10/1991
EP     450917 A2 * 10/1991    .............. G06F 12/08
(Continued)

OTHER PUBLICATIONS

Ciuffoletti, "The Wandering Token: Congestion Avoidance of a Shared Resource," Technical Report TR-05-13, University of Pisa, May 2005, 17 pages.*

*Primary Examiner* — Michael Simitoski
(74) *Attorney, Agent, or Firm* — Lieberman & Brandsdorfer, LLC

(57) ABSTRACT

A method and apparatus are provided for mediating access to a shared object in a naive computer system having a shared-nothing operating system layered on a shared file system. At least one primary token is utilized as a tool to mediate ownership of one or more shared objects in the naive system. A secondary token is created and utilized to mediate ownership of one or more shared objects. The secondary token created and utilized in limited circumstances, such as when the owner of the primary token ceases communicating with one or more requesters of the primary token.

20 Claims, 6 Drawing Sheets

(56) References Cited

U.S. PATENT DOCUMENTS

| | | | |
|---|---|---|---|
| 5,535,375 A * | 7/1996 | Eshel et al. ................... 703/27 |
| 5,566,297 A * | 10/1996 | Devarakonda et al. ......... 714/15 |
| 5,634,122 A * | 5/1997 | Loucks et al. ..................... 1/1 |
| 5,893,086 A * | 4/1999 | Schmuck et al. .................. 1/1 |
| 6,023,706 A * | 2/2000 | Schmuck et al. .................. 1/1 |
| 6,032,216 A * | 2/2000 | Schmuck et al. ............. 710/200 |
| 6,041,383 A * | 3/2000 | Jeffords et al. ............... 710/200 |
| 6,389,420 B1 | 5/2002 | Vahalia |
| 6,539,446 B1 * | 3/2003 | Chan ............................ 710/200 |
| 7,409,389 B2 * | 8/2008 | Ananthanarayanan et al. ...... 1/1 |
| 7,418,500 B1 * | 8/2008 | Bolinger et al. .............. 709/225 |
| 7,475,199 B1 * | 1/2009 | Bobbitt et al. ................ 711/154 |
| 7,596,563 B1 * | 9/2009 | Dickson ............................ 1/1 |
| 7,698,708 B1 * | 4/2010 | Lent et al. .................... 718/104 |
| 7,788,716 B2 * | 8/2010 | Dapkus et al. ................. 726/18 |
| 8,495,266 B2 * | 7/2013 | Reuter .......................... 710/242 |
| 8,560,747 B1 * | 10/2013 | Tan et al. ..................... 710/200 |
| 8,700,584 B2 * | 4/2014 | Ananthanarayanan et al. ............................ 707/704 |
| 2002/0188590 A1 * | 12/2002 | Curran et al. ..................... 707/1 |
| 2003/0018785 A1 | 1/2003 | Eshel et al. |
| 2004/0066741 A1 * | 4/2004 | Dinker et al. ................. 370/216 |
| 2004/0215772 A1 * | 10/2004 | Dinker et al. ................. 709/225 |
| 2004/0221079 A1 * | 11/2004 | Goldick ....................... 710/200 |
| 2004/0230877 A1 * | 11/2004 | Clark et al. .................... 714/48 |
| 2005/0273529 A1 * | 12/2005 | Young et al. .................... 710/58 |
| 2006/0136637 A1 * | 6/2006 | Goldick ........................ 710/200 |
| 2007/0027872 A1 * | 2/2007 | Johnson et al. .................. 707/9 |
| 2007/0180517 A1 * | 8/2007 | Rhelimi et al. ................. 726/20 |
| 2008/0168458 A1 * | 7/2008 | Fachan et al. ................. 718/104 |

FOREIGN PATENT DOCUMENTS

| | | |
|---|---|---|
| JP | 5210637 A | 8/1993 |
| JP | 9223032 A | 8/1997 |
| JP | 2000020324 A | 1/2000 |

* cited by examiner

DISTRIBUTED LOCK MANAGER FOR FILE SYSTEM OBJECTS IN A SHARED FILE SYSTEM

BACKGROUND OF THE INVENTION

1. Technical Field

This invention relates to a naive computer system created by layering a shared-nothing operating system with a shared file system. More specifically, the invention relates to mediating access to a shared object in the naive computer system.

2. Description of the Prior Art

A shared-nothing multi-processor is an environment where the processors are interconnected, but each processor has its own memory, cache, and disks. This type of multiprocessing environment is also referred to as a pure cluster. Each processor in a shared-nothing environment is a complete stand-alone machine and runs a copy of an operating system. When such processors are connected by a local area network, the processors are loosely coupled. Similarly, when such processors are connected by a switch, the processors are tightly coupled. Communication between the processors in either of the above-described connections is done through a message passing protocol. Each processor resource, i.e. memory, storage, file systems, IP addresses, etc., in a shared-nothing operating system are not simultaneously accessed, used, or shared—only one processor at a time may own or use the resource. The Microsoft Windows® operating system is an example of a shared-nothing operating system.

In contrast to the shared-nothing multi-processor environment, there are shared file systems which allow all interconnected processors and associated servers to share and use the same file system. This includes servers with different operating systems. An example of a shared file systems includes a network file system in the form of a distributed file system that supports access to files and directories located on remote computers, and treats those files and directories as if they were local. More specifically, operating system commands can be used to create, remove, read, write, and set file attributes for remote files and directories.

It is known in the art that a computer operating with a shared-nothing operating system does not typically function with a shared file system. However, a shared-nothing environment may co-exist with a shared file system. One example of co-existence of a shared-nothing protocol with a shared everything protocol is to install a high availability option with a shared-nothing protocol. A high availability option is a system design protocol and implementation that ensures a certain absolute degree of operational continuity during a given measurement period. This form of co-existence adds a shared-nothing functionality to a shared file system. More specifically, all processors in such a layered environment have access to the shared file system, but only one processor may own or use the file system at a time. This reflects the shared-nothing operating system ignorance of the shared data environment. Accordingly, there is a need to enhance access to and sharing of objects in the shared file system in a co-existence environment, such as a tool to support multiple servers in the layered environment owning and using the shared file system.

SUMMARY OF THE INVENTION

This invention comprises a method and system for arbitrating access to a shared object in a computing environment wherein a shared-nothing operating system is layered with a shared file system.

In one aspect of the invention, a method is provided for managing a shared file system that co-exists with a server operating with a shared-nothing operating system. A primary token is established in the computer system as a tool to control access to one or more shared objects in the file system. The processor requests ownership of the primary token from a prior owner of the primary token, or if there is no current owner then the processor takes ownership of the primary token. In response to receipt of a silent, unexpected, or expected negative response from the prior owner of the primary token, a secondary token is created. The secondary token is used to take ownership of the object in the file system protected by the primary token.

In another aspect of the invention, a computer system is provided with a shared file system, and a processor operating a shared-nothing operating system in communication with the shared file system. A primary token is provided as an element to control access to a shared object in the file system. In addition, a manager is provided to facilitate an ownership request of the primary token by the processor from a prior owner of the primary token. Upon receipt of a silent, unexpected, or expected negative response by the manager from the prior owner of the primary token, a secondary token is issued. The secondary token is used to take ownership of the object in the file system protected by the primary token.

In yet another aspect of the invention, an article is provided with a tangible computer readable carrier including computer program instructions configured to manage a shared file system that co-exists with a shared-nothing operating system. Instructions are provided to establish a primary token in a computer system as an element to control access to an object in the file system as a shared resource. Instructions are provided to issue a request for ownership of the primary token from a requesting server to an owning server. In addition, instructions are provided to issue a secondary token in response to receipt of a silent, unexpected, or expected negative response from the prior owner of the primary token. The secondary token is used to take ownership of the object in the file system protected by the primary token.

In an even further aspect of the invention, a method is provided for managing a shared file system that co-exists with a server operating with a shared-nothing operating system. A primary token is established in the computer system as a tool to control access to one or more shared objects in the file system. The processor requests ownership of the primary token from a prior owner of the primary token, or if there is no current owner then the processor takes ownership of the primary token. If a negative response is received from the prior owner of the primary token, a secondary token is created. The secondary token is used to take ownership of the object in the file system protected by the primary token.

Other features and advantages of this invention will become apparent from the following detailed description of the presently preferred embodiment of the invention, taken in conjunction with the accompanying drawings.

DESCRIPTION OF THE PREFERRED EMBODIMENT

Overview

Operating systems that are unaware of shared file systems or data environments are considered naive. Shared file system objects that are either unaware of or unable to handle and protect shared-nothing operating system requirements are also considered naive. Such naive systems require tools to facilitate and manage reading from and writing to objects between a shared-nothing operating system and a shared file system to recognize, map, and coordinate the different layers of these naive systems.

Technical Details

Figure 1:
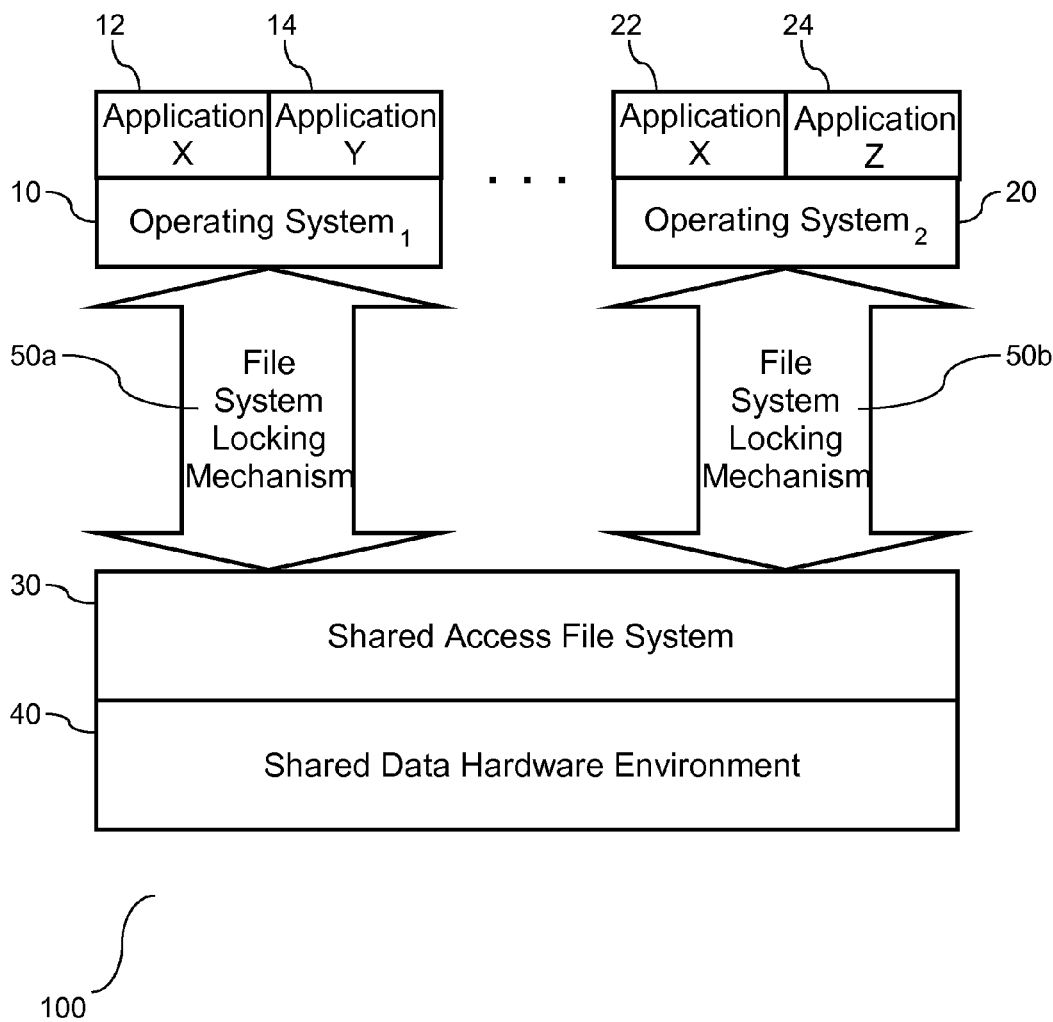
FIG. 1 is a block diagram of a naive system with a locking mechanism.
Figure 2:
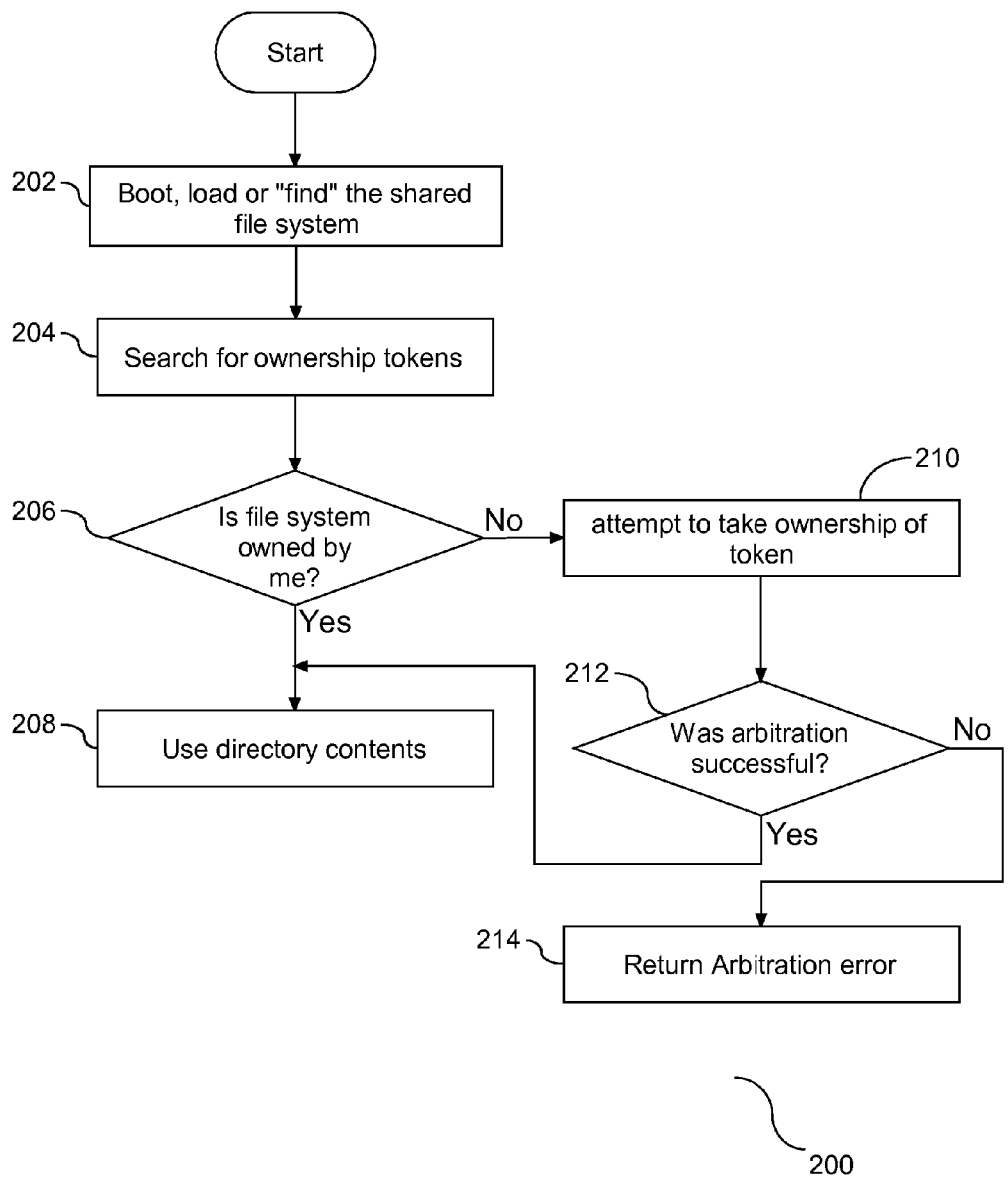
FIG. 2 is a flow chart illustrating a method for mediating access to a shared object in a naive system.
Figure 3A:
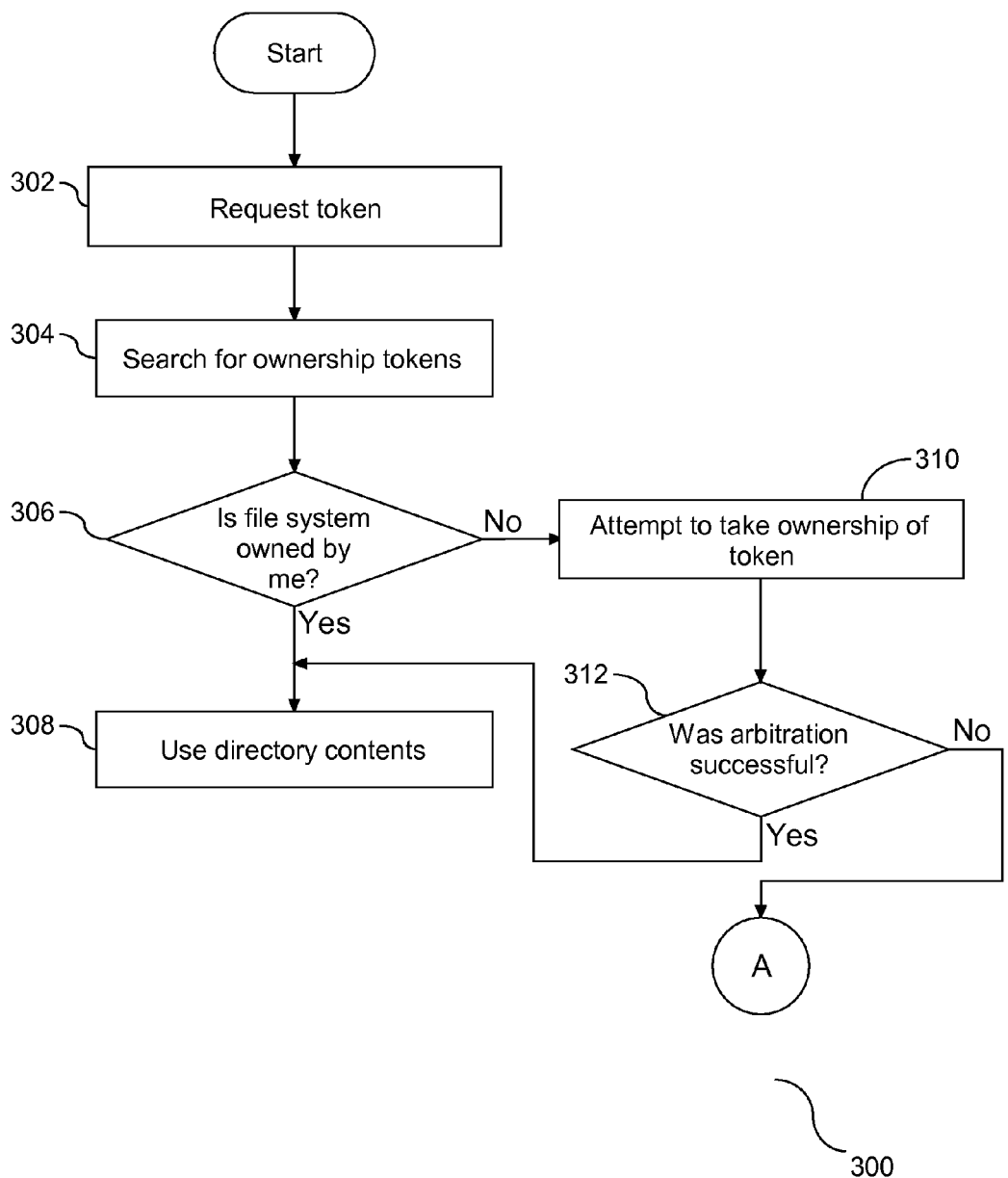
FIGS. 3A and 3B are a flow chart illustrating a method for arbitrating token ownership according to the preferred embodiment of this invention, and is suggested for printing on the first page of the issued patent.
Figure 3B:
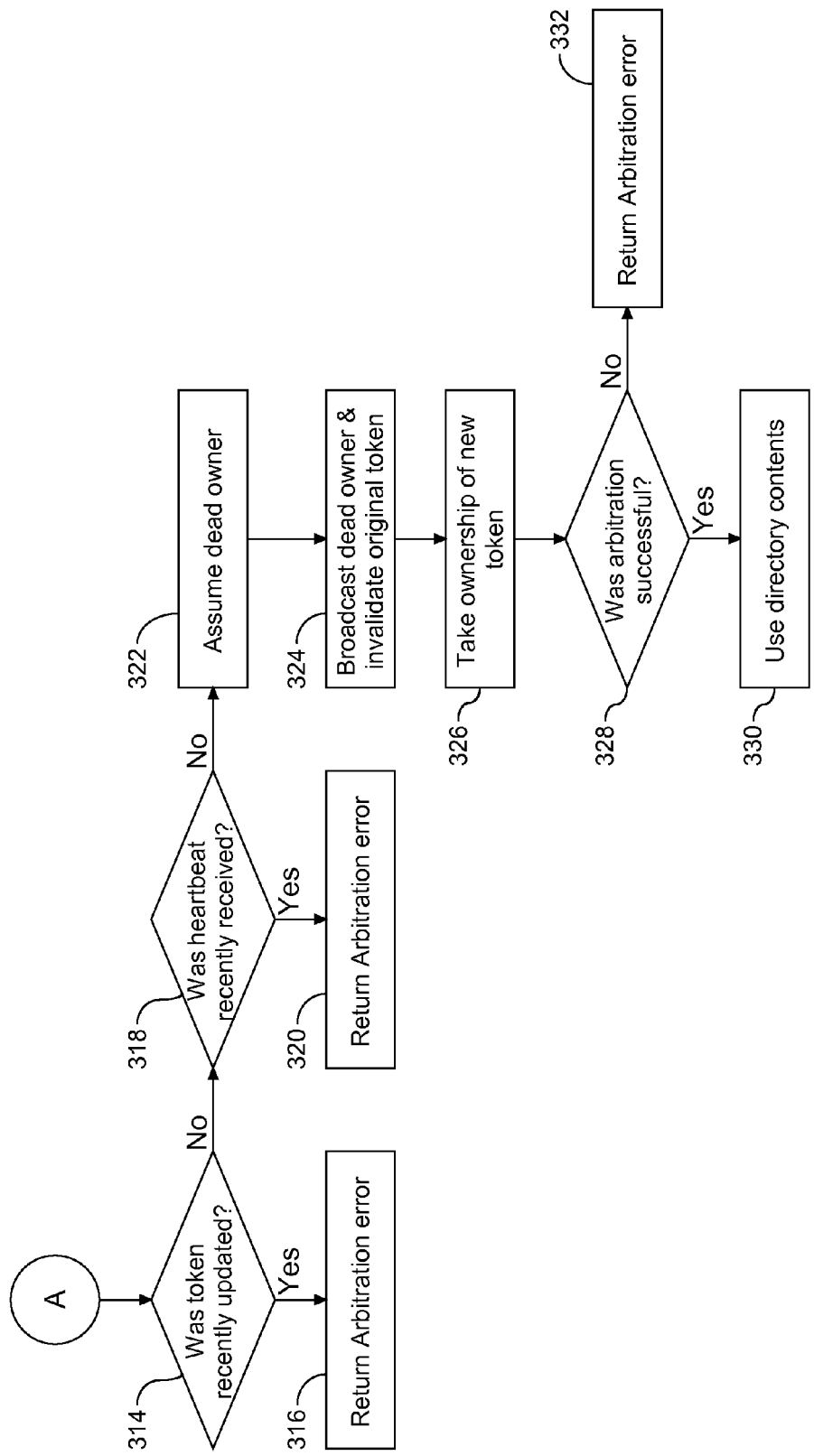
Figure 4:
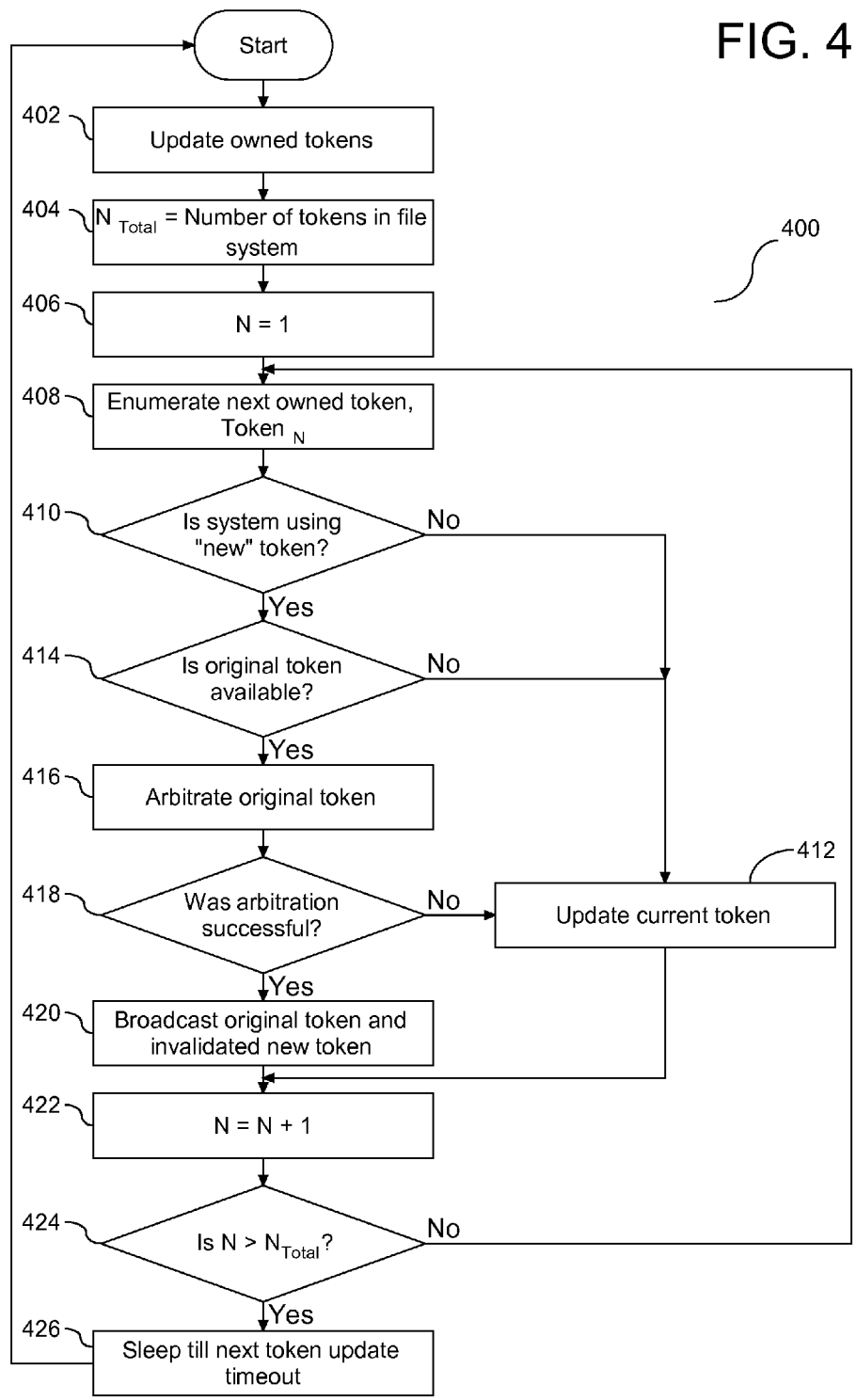
FIG. 4 is a flow chart illustrating a method for updating token ownership.

FIG. 1 is a block diagram (100) illustrating one example of layering of computer systems to create a naive system. As shown, there are at least two operating systems, $OS_1$ (10) and $OS_2$ (20). Each of the operating systems $OS_1$ (10) and $OS_2$ (20) are shared-nothing operating systems. $OS_1$ (10) is shown with two applications (12) and (14) operating within the system, and $OS_2$ (20) is shown with two applications (22) and (24) operating within the system. In one embodiment, there may be fewer applications operating within the file system or more applications operating within the file system. The invention should not be limited to the quantity of operating systems or applications shown herein. Each of the operating systems, $OS_1$ (10) and $OS_2$ (20), are in communication with a shared access file system (30) layers on a shared data hardware environment (40). A file system locking mechanism (50a), (50b) is provided for each operating system, $OS_1$ (10) and $OS_2$ (20), respectively, to facilitate and mediate sharing of objects between the shared file system (30) and the shared-nothing operating systems $OS_1$ (10) and $OS_2$ (20). As shown herein, the file system locking mechanisms (50a) and (50b) are filters. However, the mechanism (50a), (50b) should not be limited to use of a filter and may be any mechanism that is capable of providing the necessary functions. In one embodiment, the file system locking mechanism (50a), (50b) may be in the form of a driver or a SCSI protocol. The locking mechanism coordinates different locking layers of the operating systems, the file systems, and the data environment. FIGS. 2-4 below describe in detail the functionality of the file system locking mechanism. In one embodiment, the file system locking mechanism functions as a manager to facilitate negotiation of temporary ownership of an object in the file system to an application requesting ownership of the object. Accordingly, a tool is provided to facilitate access to objects in the shared file system to support layering in a naive system.

FIG. 2 is a flow chart (200) demonstrating a method for a server operating a shared-nothing operating system to temporarily access an object in a shared file system environment in communication with the server, while satisfying the shared-nothing expectation of a shared-nothing operating system. Initially, the server operating the shared-nothing operating system finds the shared file system (202). In one embodiment, the process of finding the shared file system may occur at time of boot of the server, during loading of a driver, file, etc., or at any time that the server finds the shared file system. Following step (202), the server is in communication with the shared file system and may access objects in the file system. At such time as the server requests access to an object in the file system, the file system locking mechanism searches for an ownership token in the file system for the requested object (204). An ownership token is a management apparatus in the file system that allows multiple servers and operating systems to have access to the same storage media or file system while providing temporary ownership of one or more objects in that file system to a server in communication with the file system. In one embodiment, the ownership token may be a file, a directory, metadata, etc. When the file system locking mechanism has completed its search, a determination is conducted by the file system locking mechanism as to whether the requesting server is in possession of the ownership token (206). The server may be returning from a crash or other form of shut-down. Since the server is part of naive file system it does not have knowledge of the token. In one embodiment, token ownership is embedded in the token. For example, token ownership may be in the form of a server identifier that is embedded in the token. This enables the file system locking mechanism to determine server ownership through the token itself. If the response to the determination at step (206) is positive, the requesting server temporarily owns the requested object identified by the token. The requesting server in possession of the token may access the requested object, e.g. read and/or write to the object, associated with the token (208). In one embodiment, the requested object may include directory contents for a requested file. Conversely, if the response to the determination at step (206) is negative, the file system locking mechanism may attempt to take ownership of the requested object of the associated token on behalf of the requesting server (210). Following step (210), a determination is conducted by the file system locking mechanism as to whether the file system locking mechanism successfully took possession of the ownership token for the requesting server (212). If the response to the determination at step (212) is positive, the file system locking mechanism transfers the token to the requesting server and the requesting server in possession of the token may access the requested object identified by the token (208). Conversely, if the response to the determination at step (212) is negative, this is an indication that the token associated with the requested object is not available. An arbitration error is returned to the server by the file system locking mechanism (214). The file system locking mechanism may request the token at a later time depending upon the access needs of the server. Possession of the token in a naïve file system provides the server in possession of the token with temporary ownership or one or more shared objects in the shared file system. Accordingly, the server operating with a shared-nothing operating system and in communication with a shared file system may access and temporarily own one or more shared objects in the shared file system through the file system locking mechanism.

As described above, a token is utilized to grant temporary access of an object to a server operating a naive operating system in communication with a shared file system. The grant of the token is for temporary ownership, and when the server has completed the task, e.g. read and/or write, associated with the requested object, the token must be surrendered to the next requesting server. In the event that there is no server requesting the token, the existing owner of the token can release the token when finished using the resource. However, in some circumstances with multiple servers in communication with the shared file system, it is possible that a prior owner of the token may cease communicating with the next requesting server and therefore may not be able to transfer ownership of the token. FIGS. 3A and 3B are a flow chart (300) demonstrating a process for arbitrating token ownership and access to a shared object when there is a miscommunication among the servers in communication with the shared file system. Initially, a server, $Server_1$, requests access to a file system object. However, since the server is part of a naive computer system, the server assumes that the requested object is not a shared object. A file system locking mechanism in communication with the server, $Server_1$, requests the ownership token in the form of a primary token to transfer to the requesting server in order for the requesting server to obtain temporary ownership of one or more objects in the file system (302). Following the server request at (302), the file system locking mechanism searches for the primary token in the file system for the requested object (304). A primary token is a management apparatus in the file system that allows multiple servers and operating systems to have access to the same storage media or file system while providing temporary ownership of one or more objects in that file system to a server in communication with the file system. In one embodiment, the primary token may be a file, a directory, metadata, etc. When the file system locking mechanism has completed its search, a determination is conducted by the file system locking mechanism as to whether the requesting server, $Server_1$, is in possession of the requested primary token (306). The server may be returning from a crash or other form of shut-down. Since the server is part of naive file system it does not have knowledge of the token. If the response to the determination at step (306) is positive, the requesting server, $Server_1$, temporarily owns the requested object identified by the primary token. The requesting server, $Server_1$, in possession of the primary token may access the requested object associated with the primary token (308). In one embodiment, the requested object may include directory contents for a requested file. Conversely, if the response to the determination at step (306) is negative, the file system locking mechanism may attempt to take ownership of associated primary token on behalf of the requesting server (310). Following step (310), a determination is conducted as to whether the file system locking mechanism successfully took ownership of the primary token for the requesting server, $Server_1$, (312). If the response to the determination at step (312) is positive, file system locking mechanism transfers the token to the requesting server, $Server_1$ and the requesting server, $Server_1$, in possession of the primary token may access the requested object identified by the primary token (308). Conversely, if the response to the determination at step (312) is negative, this is an indication that the primary token associated with the requested object is not available. Thereafter, a determination is conducted as to whether the requested primary token was recently updated (314). FIG. 4 below demonstrates one embodiment of how a token is updated. A positive response to the determination at step (314) is an indication that the prior owner of the primary token is continuing to access the shared object and has asserted its right to the access by continuing to utilize the primary token. In one embodiment, the requesting server, $Server_1$, is informed by the file system locking mechanism of the continued use of the primary token by another server through an arbitration error message (316). Accordingly, a primary token that is actively being used by another server may continue to be actively owned by that server.

However, if the response to the determination at step (314) is negative, this is an indication that the prior owner of the primary token may be continuing to retain possession of the primary token but not using the primary token. To determine the status of the primary token and the owner, it must be determined if the owning server is in communication with the file system and/or other servers in the network (318). In one embodiment, such a determination is conducted with the use of a heartbeat message protocol. In a cluster environment, heartbeat messages are periodically communicated among the members of the cluster, and the file system locking mechanism may monitor the periodic heartbeat to determine if the owning server is in communication with the file system. Similarly, in one embodiment, the file system locking mechanism may issue a heartbeat message or similar communication protocol to the owning server, wherein the message or communication protocol includes a request for a return reply from the recipient. Regardless of the communication protocol employed, the file system locking mechanism initiates the communication protocol because the file system locking mechanism determines whether or not it takes ownership of the token. If the response to the determination at step (318) is positive, this is an indication that the server in possession of the primary token is in communication with the file system and retains possession of the primary token (320). However, if the response to the determination at step (318) is negative, this is an indication that the server in possession of the primary token has temporarily or permanently ceased communication with other servers in the network (322). In one embodiment, the file system locking mechanism requesting the primary token on behalf of a requesting server may receive a response that is an unexpected response and does not address whether or not the owning server is in communication with the file system and/or other servers in the network. Such a response is considered inappropriate, e.g. unexpected, in that it does not address the availability of the primary token. Examples of an inappropriate response may include a response that is neither a grant of the token nor a denial of the request for the token. In another example, the server in possession of the primary token may not be using the primary token but at the same time may be unable to return the primary token to the file system since there is a temporary or permanent cessation of communication.

The file system locking mechanism may proceed to acquire a token for the requested object on behalf of the requesting server, $Server_1$. The first step is to assume that the server in possession of the primary token is somehow detached from the file system (322). The file system lock mechanism broadcasts a message to all servers in communication with the file system on behalf of requesting server, $Server_1$, that the server in possession of the token is unavailable and that the primary token held by that server is being invalidated (324). Thereafter, the file system locking mechanism takes ownership of a new token on behalf of the requesting server, $Server_1$ (326). The new token is hereinafter referred to as a secondary token. The type of the secondary token and its location may be predetermined and stored in a static location in the file system, such as the Windows Registry or the Unix config files, or it may be newly created as needed and then the token information can be broadcast to all file system locking mechanisms from the creating server. Following the ownership of the secondary token, a determination is conducted as to whether the acquisition by the file system locking mechanism on behalf of at step (326) was successful (328). If the response to the determination at step (328) is positive, the requesting server in possession of the secondary token may access the requested object identified by the token (330). Conversely, if the response to the determination at step (328) is negative, this is an indication that the secondary token associated with the requested object is not available. An arbitration error is returned to the file system locking mechanism associated with the requesting server, and the file system locking mechanism communicates an access denial of the token to the requesting server (332). The server may request access to the file system object at a later time at which time the file system locking mechanism would again arbitrate handling of the associated token depending upon the access needs of the server. In one embodiment, the secondary token may be used until such time as the original token again becomes available to the file system, and at such time, the secondary token may be released and invalidated to prevent a conflict between two active tokens for a specified object. Accordingly, the server operating with a shared-nothing operating system and in communication with a shared file system may access a secondary token under limited circumstances in order to access and temporarily own a shared object in the shared file system.

As illustrated above, in limited circumstances, the server in possession of the primary token may cease communicating with the file system and the primary token owned by the server may be invalidated by another requesting server. In one embodiment, token ownership is periodically updated in the file system to prevent invalidation attempts of an owned and active primary token. FIG. 4 is a flow chart (400) illustrating a process for periodically updating token ownership in the file system. The token update process is initiated by the server in possession of the primary token (402). The server(s) request access to an object in the file system, and the file system locking mechanism translates the access request to a request for token ownership. In one embodiment, the file system may have more than one primary token available with each of the primary tokens specified for different objects in the file system. The total number of owned tokens in the file system is assigned to the variable $N_{total}$ (404), and the variable N is assigned to the integer one (406). The variable N is a counting variable to count the number of owned tokens in the file system. The owned token, $Token_N$ is specified (408), and a determination is conducted as to whether $Token_N$ is a secondary token created in response to possession of a primary token by a non-responsive server (410). If it is determined that $Token_N$ is a primary token, the file system locking mechanism in communication with the server in possession of $Token_N$ may update $Token_N$ to the file system (412). In one embodiment, a token update may be in the form of a message communicated to the file system locking mechanism on each of the servers which are servers in communication with the file system of the continued use of $Token_N$ by the owning server. However, if it is determined that $Token_N$ is not a primary token; a subsequent determination is conducted as to whether the primary token is available (414). A negative response to the determination at step (414) will result in the file system locking mechanism in communication with the server in possession of $Token_N$ to update $Token_N$ to the file system (412). However, if it is determined at step (414) that the primary token is available, then the file system lock mechanism in communication with the server in possession of the secondary replacement token arbitrates the primary token to re-acquire ownership of the primary token on behalf of the associated server (416). Following step (416), a determination is conducted as to whether the file system locking mechanism for the server in possession of the replacement secondary token successfully arbitrated the primary token (418). If it is determined that the file system locking mechanism associated with the requesting server was not successful in arbitrating the primary token, then the requesting server may update $Token_N$ to the file system (412). However, if it is determined that the file system lock mechanism was successful in arbitrating the primary token on behalf of the requesting server, then the file system lock mechanism broadcasts the primary token and invalidates the secondary replacement token on behalf of the requesting server (420). Following steps (412) and (420), the variable N is incremented (422) to proceed to evaluating the next token in the file system. However, prior to evaluating the next token, a determination is conducted as to whether there are any more tokens subject to evaluation (424). In one embodiment, the determination at step (424) may be a comparison of the incremented counter to the variable $N_{total}$. If it is determined at step (424) that there is at least one more token to be evaluated, the process returns to step (408). Conversely, if it is determined at step (424) that all of the tokens have been evaluated, the process is completed. In one embodiment, completion of the token update process may include waiting a preset time interval prior to re-starting the token update process (426). Accordingly, the process outlined herein releases and invalidates replacement secondary tokens at such time as a primary token again becomes available.

In one embodiment, the invention is implemented in software, which includes but is not limited to firmware, resident software, microcode, etc. The invention can take the form of a computer program product accessible from a computer-usable or computer-readable medium providing program code for use by or in connection with a computer or any instruction execution system. For the purposes of this description, a computer-usable or computer readable medium can be any apparatus that can contain, or store the program for use by or in connection with the instruction execution system, apparatus, or device.

Figure 5:
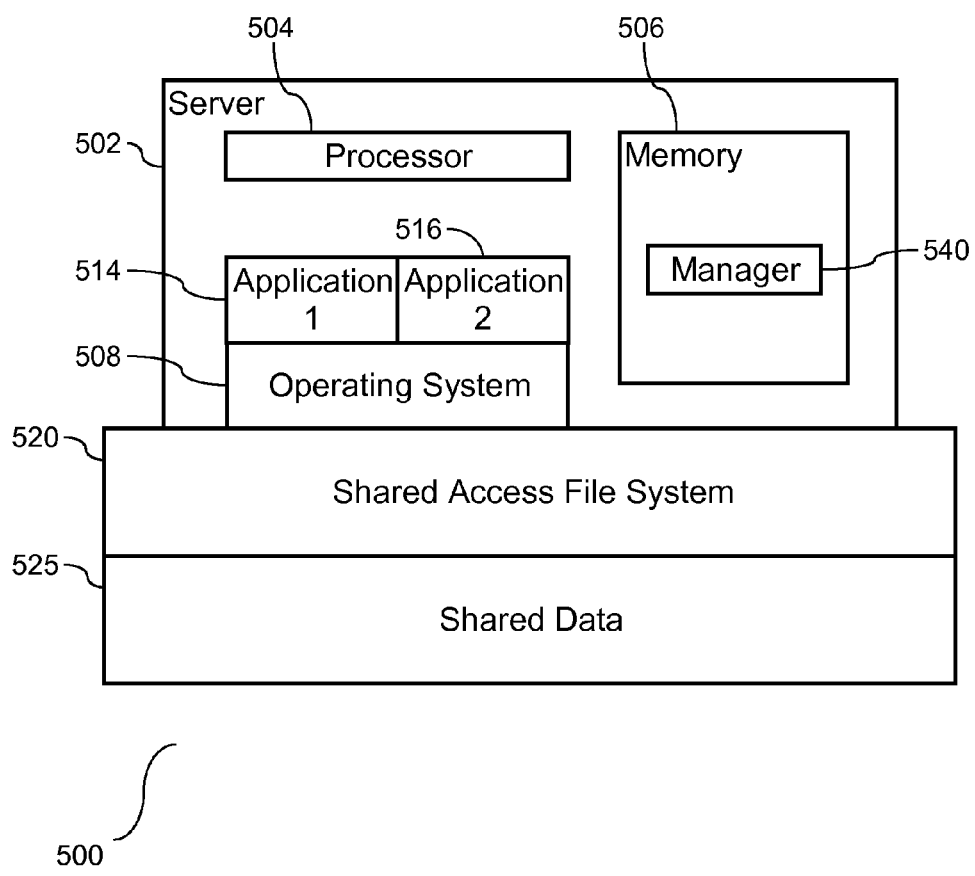
FIG. 5 is a block diagram of a file system locking tool embedded in a computer system.

FIG. 5 is a block diagram (500) illustrating placement of the file system locking tool in a computer system. The illustration shows a server (502) with a processor (504), memory (506) in communication with a shared file system (520) and shared storage media (525). As shown in FIG. 1, the server (502) may operate one or more applications (514) and (516) in a shared-nothing operating system (508). A file system locking tool in the form of a manager (540) is shown residing in memory (506) of the server (502). The manager (540), also known as the file system locking mechanism, mediates and facilitates locking of shared objects to support co-existence of the shared-nothing operating system and the shared file system, as described in detail in FIGS. 2-4 above. The manager (540) may utilize instructions in a computer readable medium to mediate reading and writing of shared objects between the shared-nothing operating system and the shared file system. In one embodiment, the manager (540) utilizes a token (not shown) as a tool to facilitate the mediation. The token may be in the form of a file, a directory, meta data, an attribute of the file system, and an object in the file system. Similarly, in one embodiment, the manager (540) may reside as a hardware tool external to memory (506), or it may be implemented as a combination of hardware and software. Accordingly, the manager (540) may be implemented as a software tool or a hardware tool to facilitate mediation of a shared object between a shared-nothing operating system layered with a shared file system.

Embodiments within the scope of the present invention also include articles of manufacture comprising program storage means having encoded therein program code. Such program storage means can be any available media which can be accessed by a general purpose or special purpose computer. By way of example, and not limitation, such program storage means can include RAM, ROM, EEPROM, CD-ROM, or other optical disk storage, magnetic disk storage or other magnetic storage devices, or any other medium which can be used to store the desired program code means and which can be accessed by a general purpose or special purpose computer. Combinations of the above should also be included in the scope of the program storage means.

The medium can be an electronic, magnetic, optical, or semiconductor system (or apparatus or device). Examples of a computer-readable medium include a semiconductor or solid state memory, magnetic tape, a removable computer diskette, random access memory (RAM), read-only memory (ROM), a rigid magnetic disk, and an optical disk. Current examples of optical disks include compact disk B read only (CD-ROM), compact disk B read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks.

The software implementation can take the form of a computer program product accessible from a computer-useable or computer-readable medium providing program code for use by or in connection with a computer or any instruction execution system.

Advantages Over the Prior Art

Layering of a shared-nothing operating system with a shared file system produces an environment that includes the benefits of both systems. The file system locking mechanism is a management tool utilized to leverage, mediate, and/or facilitate read and write of shared objects present in the combined environment to support the mediation at the file system level. The servers operating in a naive environment request access to one or more shared objects and a file system locking mechanism associated with the server translates that to a request for ownership token. There may be a primary token and/or a secondary token in the file system. Both the primary and secondary tokens are utilized in a manner to support access to one or more shared objects without violating the protocols of either the shared-nothing operating system or the shared file system.

Alternative Embodiments

It will be appreciated that, although specific embodiments of the invention have been described herein for purposes of illustration, various modifications may be made without departing from the spirit and scope of the invention. In particular, both a primary token and a secondary token are utilized in limited circumstances to provide access to a shared object in a naive environment. The secondary token may be in the same form as the primary token, or in a different form. For example, if the primary token is a file, then the secondary token may also be a file, an attribute of the file system, etc. Similarly, if the primary token is a directory, then the secondary token may also be a directory, a file, an attribute of the file system, etc. In the case where the primary and secondary tokens are in the same form, they would be different elements of the same form, such as different files or different directories, since the primary and secondary tokens needs to have separate identities to support the associated functionality. Accordingly, the scope of protection of this invention is limited only by the following claims and their equivalents.

I claim:

1. A method for managing a shared file system comprising:
establishing a primary token in shared data storage as an element to control access to an object in a shared file system in communication with at least two computer systems in a shared-nothing environment, including a first computer system having a first operating system in communication with a first interface and a second computer system having a second operating system in communication with a second interface, said first operating system different from the second operating system;
each of the first and second interfaces coordinating sharing of an object between an associated operating system and the shared file system;
the first computer system requesting ownership of said primary token through the first interface, including the first interface searching for the primary token in the shared file system, and identifying a prior owner of said primary token;
the first interface receiving a response to said search indicating that said prior owner of said primary token is unavailable; and
creating a secondary token in response to receipt of said response, including the first interface taking ownership of said secondary token and transferring the secondary token to the first computer system, wherein the secondary token is created while the primary token is in existence.

2. The method of claim 1, further comprising broadcasting primary token invalidation information to each server with access to said file system.

3. The method of claim 2, further comprising returning to use of said primary token when it becomes available.

4. The method of claim 3, further comprising releasing and invalidating said secondary token to all servers with access to said file system in conjunction with return of said primary token.

5. The method of claim 1, wherein the step of requesting said primary token from said prior owner includes issuing a heartbeat to said owner of said primary token to determine if said prior owner is in communication with a server requesting said primary token.

6. The method of claim 1, wherein said token is selected from the group consisting of:
a file, a directory, meta data, an attribute of the file system, and an object in the file system.

7. A computer system, comprising:
a shared file system in communication with at least two computer systems in a shared-nothing environment, including a first computer system having a first operating system in communication with a first interface and a second computer system having a second operating system in communication with a second interface, said first operating system different from the second operating system;
each of the first and second interfaces to coordinate sharing of an object between an associated operating system and the shared file system;
a manager associated with one of the first and second computer systems to request ownership of a primary token through the first interface, including the first interface searching for the primary token in the shared file system, and identifying a prior owner of said primary token, said primary token provides control access to an object in said file system;

said manager receives a negative response to said search indicating that said prior owner is unavailable; and said manager issues a secondary token in response to receipt of said negative response from said prior owner, wherein the first interface takes ownership of said secondary token and transfers the secondary token to the first computer system, wherein the secondary token is created while the primary token is in existence.

8. The system of claim 7, further comprising said manager to broadcast primary token invalidation information to each server with access to said file system.

9. The system of claim 8, further comprising a return to use of said primary token when it becomes available.

10. The system of claim 9, further comprising said manager to release and invalidate said secondary token to all servers with access to said file system in conjunction with return of said primary token.

11. The system of claim 7, wherein the request of said primary token from said prior owner includes issuance of a heartbeat to said owner of said primary token to determine if said prior owner is in communication with a server requesting said primary token.

12. The system of claim 7, wherein said token is selected from the group consisting of:
a file, a directory, meta data, an attribute of the file system, and an object in the file system.

13. An article comprising:
a non-transitory computer readable data storage medium including computer program instructions configured to manage a shared file system comprising:
instructions to establish a primary token in as an element to control access to an object in said shared file system, said file system in communication at least two, computer systems in a shared-nothing environment, including a first computer system having a first operating system in communication with a first interface and a second computer system having a second operating system in communication with a second interface, said first operating system different from the second operating system;
each of the first and second interfaces to coordinate sharing of an object between an associated operating system and the shared file system;
instructions for the first computer system to issue a request for said primary token through the first interface, including the first interface searching for the primary token in the shared file system, and identifying a prior owner of the primary token; and
instructions to issue a secondary token in response to receipt of a response to the search indicating that said server owning said primary token is unavailable, and wherein the first interface taking ownership of said secondary token and transferring the secondary token to the first computer system, wherein the secondary token is created while the primary token is in existence.

14. The article of claim 13, further comprising instructions to broadcast primary token invalidation information to each server with access to said file system.

15. The article of claim 14, further comprising instructions to return to use of said primary token when it becomes available.

16. The article of claim 15, further comprising instructions to release and invalidate said secondary token to all servers with access to said file system in conjunction with return of said primary token.

17. The article of claim 13, wherein the instructions to request said primary token from said prior owner includes instructions to issue a heartbeat to said owner of said primary token to determine if said prior owner is in communication with a server requesting said primary token.

18. The article of claim 13, wherein said token is selected from the group consisting of: a file, a directory, meta data, an attribute of the file system, and an object in the file system.

19. A method for managing a shared file system comprising:
establishing a primary token in shared data storage as an element to control access to an object in a shared file system associated with said storage, said file system in communication at least two, computer systems in a shared-nothing environment, including a first computer system having a first operating system in communication with a first interface and a second computer system having a second operating system in communication with a second interface, said first operating system different from the second operating system;
each of the first and second interfaces coordinate sharing of an object between an associated operating system and the shared file system;
the first computer system requesting ownership of said primary token through the first interface, including the first interface searching for the primary token in the shared file system, and identifying a prior owner of said primary token; and
creating a secondary token in said system in response to the first interface receipt of a negative response to the search, wherein the first interface taking ownership of said secondary token and transferring the secondary token to the first computer system, wherein the secondary token is created while the primary token is in existence.

20. The method of claim 19, wherein said negative response indicates that said prior owner is unavailable.

* * * * *